United States Patent [19]

Herr et al.

[11] 4,266,152
[45] May 5, 1981

[54] METHOD OF AND APPARATUS FOR COOLING ELECTRIC MOTORS AND TOTALLY ENCLOSED ELECTRIC MOTORS INCORPORATING SAME

[75] Inventors: John A. Herr, Garwood; Wolfgang Jaffe, Roselle Park, both of N.J.

[73] Assignee: The Singer Company, Stamford, Conn.

[21] Appl. No.: 25,167

[22] Filed: Mar. 29, 1979

[51] Int. Cl.³ .................................................. H02K 9/00
[52] U.S. Cl. .................................... 310/59; 310/62; 310/64; 310/154
[58] Field of Search ........................ 310/62, 63, 52, 53, 310/64, 65, 57–60, 154, 40 MM, 89

[56] References Cited

U.S. PATENT DOCUMENTS

| | | | |
|---|---|---|---|
| 1,892,997 | 1/1933 | Oldenburg | 310/60 |
| 2,729,758 | 1/1956 | Knapp | 310/60 |
| 3,361,917 | 1/1968 | Stahly | 310/154 |
| 3,531,668 | 9/1970 | Cathey | 310/58 |
| 3,891,876 | 6/1975 | Herr | 310/43 |
| 3,916,231 | 10/1975 | Cathey | 310/62 |
| 3,978,354 | 8/1976 | Lee | 310/154 |
| 3,982,146 | 9/1976 | Hokky | 310/58 |
| 4,063,123 | 12/1977 | Herr | 310/233 |
| 4,092,556 | 5/1978 | Mabuchi | 310/57 |
| 4,105,905 | 8/1978 | Barcus | 310/59 |
| 4,142,120 | 2/1979 | Hallerback | 310/59 |
| 4,167,683 | 9/1979 | Hallerback | 310/65 |
| 4,209,724 | 6/1980 | Periou | 310/154 |

Primary Examiner—R. Skudy
Attorney, Agent, or Firm—Elliot A. Lackenbach; Robert E. Smith; Edward L. Bell

[57] ABSTRACT

An electric motor, such as a rare-earth permanent magnet single airgap direct current motor is provided with generally longitudinally extensive heat transfer or cooling means comprising heat receptor elements adjacent but minimally spaced apart from and parallel the armature. These heat transfer elements are then cooled, as by being thermally connected with external heat discharging or dissipating structure to transfer the heat away from the motor. In one embodiment or modification the heat transfer elements project inwardly from a heat conductive end cap provided on its outer surface with heat radiating fins. In another embodiment or modification the heat transfer elements are hollow and a coolant, such as air, is circulated therethrough. The heat receptor elements may be provided with fins to increase their surface area, with the fins preferably facing the armature structure. The receptor elements are also preferably substantially coextensive with the active portion or windings of the armature. A stirring fan may also be provided mounted to the armature to provide circulation of air within the motor housing, around the armature and heat transfer elements.

24 Claims, 5 Drawing Figures

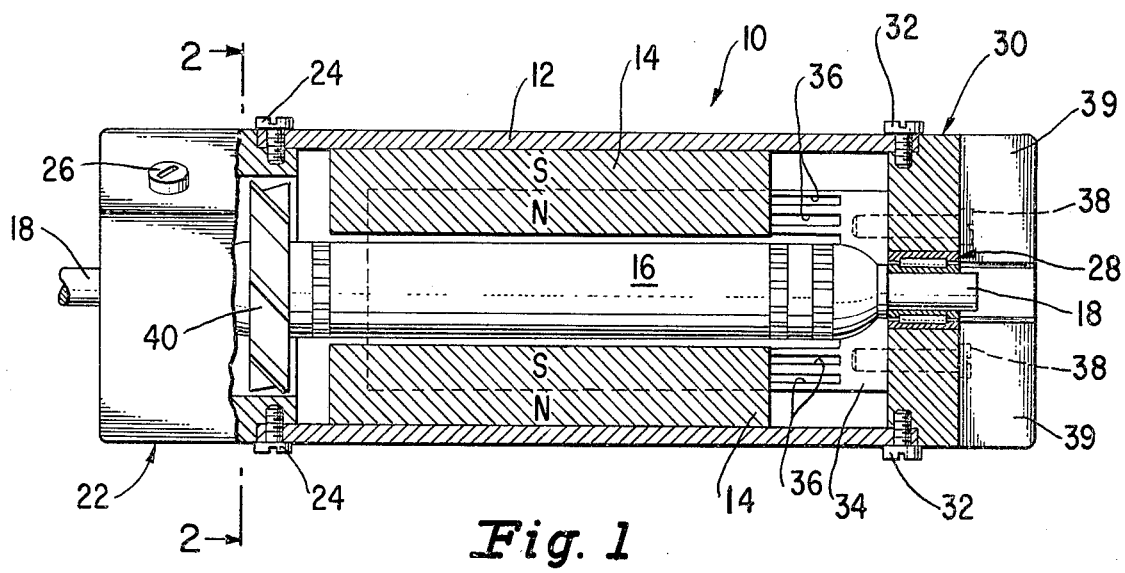
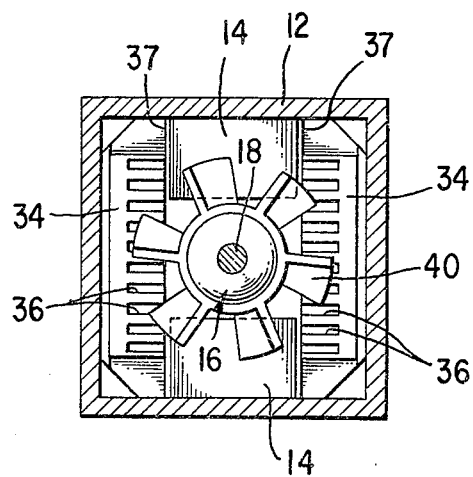
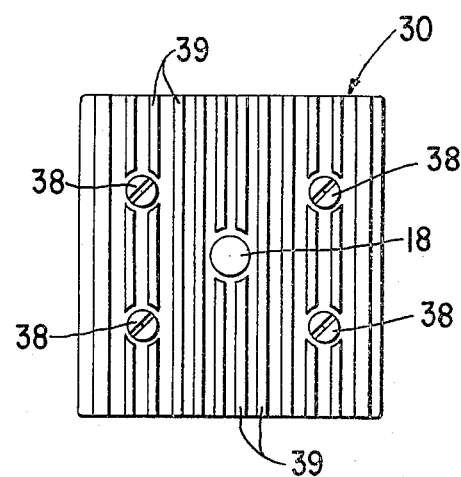

METHOD OF AND APPARATUS FOR COOLING ELECTRIC MOTORS AND TOTALLY ENCLOSED ELECTRIC MOTORS INCORPORATING SAME

DESCRIPTION

BACKGROUND OF THE INVENTION

1. Field of the Invention

This invention relates to electric motors and to methods and apparatus for the cooling thereof, particularly of totally enclosed motors and finds particular utility applied to motors having a single airgap.

2. Description of the Prior Art

In our Herr and Jaffe U.S. Pat. No. 3,891,876 issued June 24, 1975 and assigned to the assignee of the present application, there is described and disclosed permanent magnet DC motors characterized by small size, light weight, high torque-to-inertia ratio, long brush life and freedom from inherent electromagnetic interference utilizing opposing rare-earth-alloy magnets to define therebetween a single airgap having rotationally supported therein a non-ferromagnetic, low inertia armature. An improved armature structure for such motor is described and disclosed in our Herr and Jaffe U.S. Pat. No. 4,063,123 dated Dec. 13, 1977 and assigned to the assignee of the present invention.

Totally enclosed motors have long been known in the prior art and it has long been recognized to be desirable to provide special construction thereto for enhanced heat transfer to thereby restrict the temperature rise of the motor and of the various parts thereof during operation. Each of the prior art arrangements, however, have been limited by the basic requirements of essentially circular symmetry of the iron housing surrounding the armature of conventional iron core motor designs, the essentially poor heat transfer characteristics of iron, and the high hysteresis losses and the resultant high heat generation within conventional iron core armature structures.

OBJECTS OF THE INVENTION

In motors of the type exemplified by our U.S. Pat. No. 3,891,876, the inherent efficiencies, lack of iron in the armature and loss of the need to closely surround the armature with a generally cylindrical iron housing have enabled novel and efficient methods of and apparatus for cooling such motors and have resulted in novel and improved totally enclosed motors incorporating novel heat transfer means and generally longitudinally extending heat transfer structures extending closely adjacent and parallel the armature so as to limit to a satisfactory level the temperature rise characteristics.

Due to the exceedingly high magnetic flux generated by the rare-earth-alloy magnets utilized in such motors, it has been found to be highly desirable that the motors be of the totally-enclosed variety so that stray particulate matter is not drawn into the airgap to accumulate therein and against the magnets.

Bearing in mind the foregoing, it is a primary object of the present invention to provide novel and improved methods of and apparatus for cooling electric motors and to provide novel and improved electric motors incorporating the same.

Another primary object of the present invention, in addition to the foregoing object, is the provision of novel and improved totally enclosed motors of exceptionally small size, light weight, high torque, low temperature rise, high efficiency and long life.

Still another primary object of the present invention, in addition to each of the foregoing objects, is the provision in single-airgap permanent magnet motors of the class described of novel heat transfer means comprising generally longitudinal heat transfer elements closely adjacent and parallel the armature.

Yet still another primary object of the present invention, in addition to each of the foregoing objects, is the provison of novel and improved methods of and apparatus for cooling electric motors, and particularly low inertia armatures thereof, by placement of longitudinally extensive heat transfer means or elements closely adjacent and parallel but spaced apart a minimal distance from such armatures, constructed and arranged to transfer heat therefrom outwardly of a sealed motor housing.

Another and still further primary object of the present invention, in addition to each of the foregoing objects, is the provision of novel and improved methods of and apparatus for cooling electric motors by transfer of heat developed therewithin generally axially outwardly thereof through at least one of the housing end caps.

It is a feature and advantage of the present invention that the motor armature, wherein the major portion of the heat generation occurs, is effectively and efficiently cooled without any increase in the mass, size, or inertia thereof.

The invention resides in the combination, construction, arrangement and disposition of the various component parts and elements incorporated in improved cooling systems for electric motors and in improved electric motors constructed in accordance with the principles of this invention as well as in the methods of cooling defined thereby. The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modification may be suggested to those having the benefit of the teachings herein, and such other embodiments or modifications are intended to be reserved especially as they fall within the scope and spirit of the subjoined claims.

SUMMARY OF THE INVENTION

Whereas the present invention has found especial utility when applied to single airgap motors of the permanent magnet, rare-earth type, it is to be especially understood that the present invention may have applicability to other types of electric motors and it is expressly understood that although the exemplary motor described herein is of the single air gap, rare-earth permanent magnet type, the present invention is not intended to be limited thereto either in the instant specification or the subjoined claims.

In accordance with the present invention, an electric motor, such as a rare-earth permanent magnet single airgap direct current motor is provided with generally longitudinally extensive heat transfer or cooling means comprising heat receptor structure or elements adjacent but minimally spaced apart from and parallel the armature. These heat transfer elements are then cooled, as by being thermally connected with external heat discharging or dissipating structure to transfer the heat away from the motor. In one embodiment or modification the heat transfer elements project inwardly from a heat conductive end cap provided on its outer surface with heat radiating fins. In another embodiment or modification the heat transfer elements are hollow and a coolant, such as air, is circulated therethrough. The heat receptor elements may be provided with fins to increase their surface area, with the fins preferably facing the armature structure. The receptor elements are also preferably substantially coextensive with the active portion or windings of the armature. A stirring fan may also be provided mounted to the armature to provide circulation of air within the motor housing, around the armature and heat transfer elements.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing wherein like reference characters are used for similar parts throughout the various views and which discloses, illustrates and shows certain preferred embodiments or modifications of the present invention and what is presently considered and believed to be the best mode of practicing the principles thereof and wherein:

FIG. 1 is a side elevational view, partially in section, of an electric motor constructed in accordance with and provided with heat transfer or cooling means or structure in accordance with the principles of the present invention;

FIG. 2 is an elevational cross sectional illustration taken along line 2—2 of FIG. 1;

FIG. 3 is an elevational end view of the motor of FIG. 1, viewed from the right hand end as shown in FIG. 1;

DETAILED DESCRIPTION OF THE INVENTION

Figure 4:
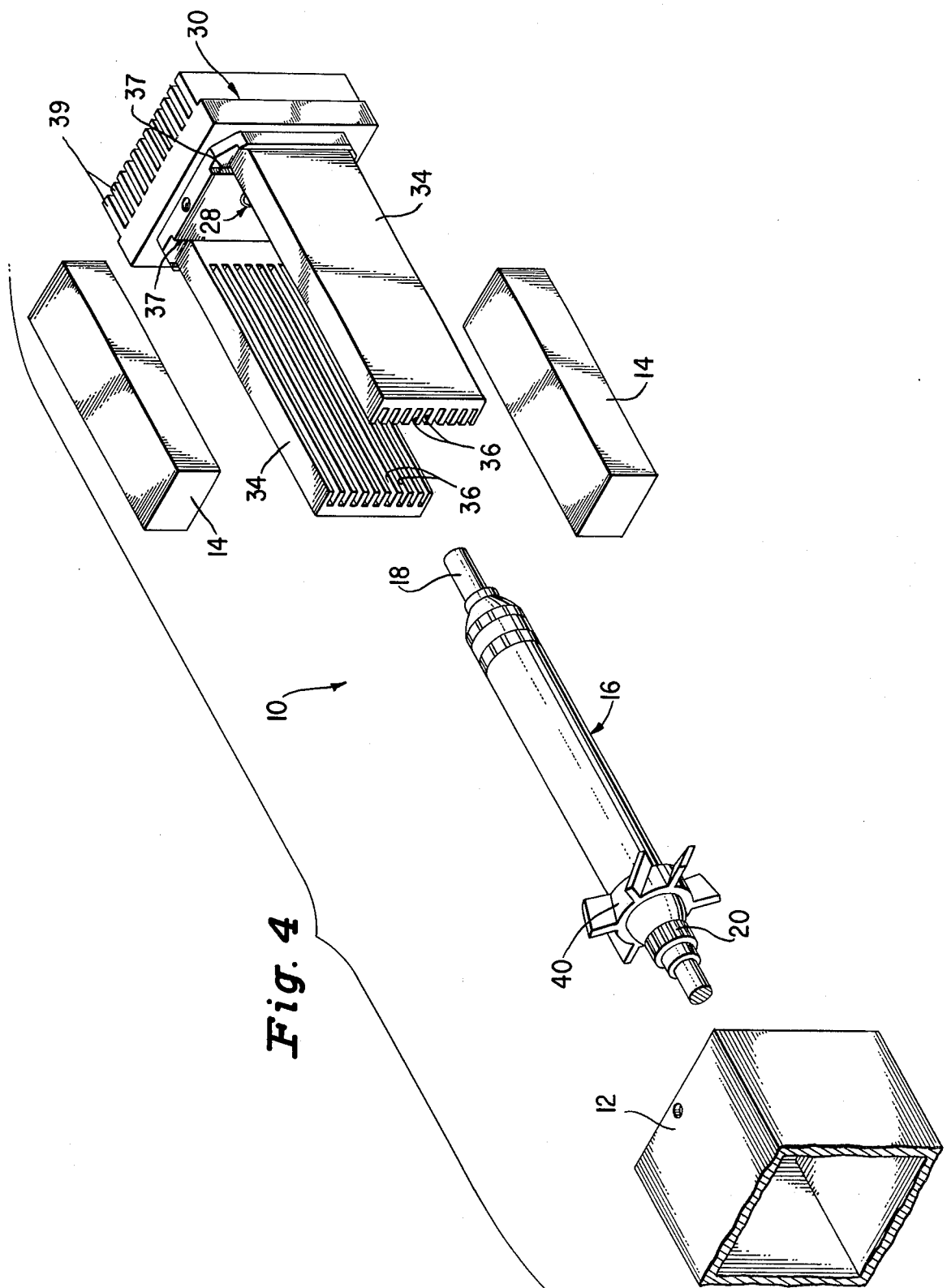
FIG. 4 is an exploded perspective illustration of the motor and heat transfer or cooling means of FIG. 1.

With reference now to the drawing, and particularly to FIGS. 1-4 thereof, there is shown and illustrated an electric motor constructed in accordance with the principles of the present invention, designated generally by the reference character 10. The motor 10 comprises a generally cylindrical housing or sleeve 12 which, as shown, may be of a generally square cross-sectional configuration and fabricated of a ferromagnetic material having high magnetic permeability, such as low carbon steel. Mounted within the ferromagnetic sleeve or housing 12 is a pair of block-shaped generally parallel elongated permanent magnets 14 to define with the sleeve or housing 12 the field structure of the motor of the present invention. The magnets 14 are preferably made of rare-earth cobolt alloys. Such alloys comprise alloys of lanthanide, a general name given to a group of rare-earth elements beginning with lanthanum in the Periodic Table of the Elements, and cobolt, with the magnets generally manufactured by aligning powders in a high magnetic field and densifying the powders with high pressure. The powders may be resin bond or sintered and magnetized as part of the manufacturing process thereof or they may be magnetized after assembly with the motor housing. Suitable magnets have been manufactured and sold, for example, under the trademark Lanthanet by Tohoku Metal Industries, Ltd. of Japan, under the trademark Recoma by BBC Brown, Boveri & Co., Ltd. of Baden, Switzerland and under the trademark Hicorex by Hitachi Magnetics Corp. of Edmore, Mich.

Each of the magnets 14 is magnetized across the small dimension and they are assembled in relative opposing relation so that the inner faces of the magnets present preferably flat poles of opposite polarity as shown by the letters N, S in FIG. 1 and form the single working airgap for the motor, the housing or sleeve 12 completing the magnetic circuit. The housing of sleeve 12 is sufficiently wide with the sides thereof sufficiently spaced apart from the magnets 14 that they do not short or shunt the magnetic flux in the airgap and provide clearance for the cooling means of the present invention. The magnets 14 may be retained in position solely by their attraction to the housing or sleeve 12 or they may be additionally secured to the inner faces thereof as by epoxy cement, or the like.

The term "airgap" is used herein in the connotation regularly used in the art as defined, for instance, in the Modern Dictionary of Electronics published 1970 by Bobbs-Merril Co., Inc. as "a non-magnetic discontinuity in a ferro-magnetic circuit."

The motor 10 further comprises an armature 16 which may, for example, be of the low inertia, ironless type such as is described in more detail in our prior U.S. Pat. No. 4,063,123 dated Dec. 13, 1977, assigned to the assignee of the instant application and hereby incorporated herein by reference as fully and completely as if reproduced hereat. The armature 16 is mounted on an armature shaft 18, preferably of a non-ferromagnetic material such as stainless steel and is provided with a commutator 20 with the commutator end portion of the armature being supported for rotation in a bearing (not shown) in a commutator end cap 22 mounted to one end portion of the sleeve or housing 12, as by means of screws 24. The commutator end cap 22 is provided with brushes (not shown) engaging the armature commutator 20 and held in position by brush holders 26. For further details of the operation and commutation of the motor 10, reference may be had to our prior U.S. Pat. No. 3,891,876 dated June 24, 1975, assigned to the assignee of the instant application, and hereby incorporated herein by reference as fully and completely as if reproduced hereat.

The opposite end of the armature 16 is supported by a bearing 28 in a second end cap 30 which may be fixedly mounted with the other end portion of the sleeve or housing 12, as by means of screws 32.

In accordance with the present invention heat transfer means comprising a pair of generally longitudinally extensive heat receptor and transfer elements or members 34 are provided extending generally longitudinally within the sleeve or housing 12, adjacent and closely spaced apart from or in minimally spaced apart relationship to the armature 16 and generally parallel thereto. The heat receptor and transfer elements 34 preferably extend substantially entirely lengthwise or co-extensive of the active or working windings of the armature 16. The heat receptor and transfer elements 34 may, as shown, be provided with generally longitudinally extensive fins 36 so as to increase the surface areas thereof with the fins 36 facing the armature 16 and the elements 34 may be mounted with the end cap 30, as being integrally formed therewith or, as shown, by being separately formed and positioned within grooves 37 milled or otherwise formed on the inner surface of the end cap 30 and attached thereto in intimate heat transfer relationship, as by means of screws 38. The outer face of the end cap 30 may then be provided with heat discharge or radiating fins 39. The heat receptor and transfer elements 34 and the end cap 30, including its integral fins 39 are preferably fabricated of a non-magnetic material having high thermal conductivity and low specific heat, such as aluminum or copper, or there may be made of an electrically insulating ceramic having the requisite thermal properties such as barium titanate and together define the heat transfer or cooling means of the present invention. Accordingly, heat generated within the housing or sleeve 10, and especially within the armature 16 may be transferred to the longitudinally extensive heat receptor and transfer elements 34 and longitudinally thereof outwardly through the end cap 30 for dissipation or discharge by means of the end cap fins 39. To further aid in providing efficient cooling and heat transfer, especially from the armature 16, the armature 16 may be provided with a stirring fan 40 carried thereby to stir the air within the housing or sleeve 10, around the armature 16, the longitudinal at receptor and transfer elements 34 and between the fins 36 thereof.

Figure 5:
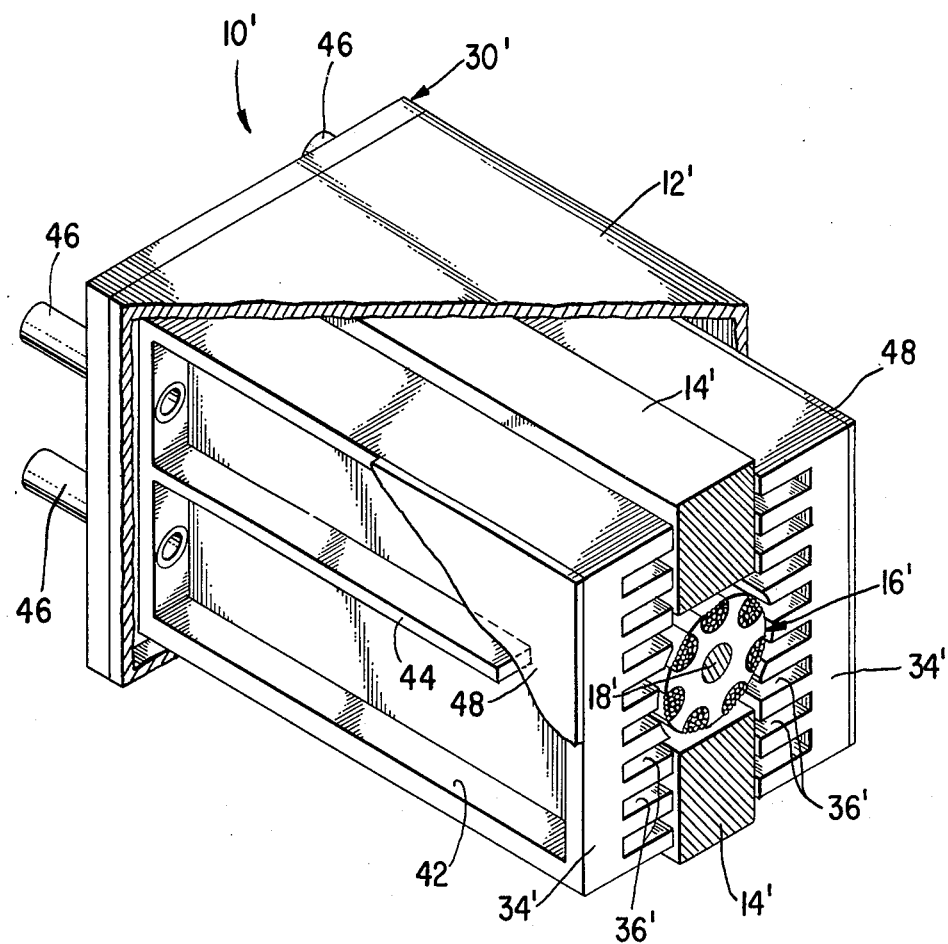
FIG. 5 is a perspective illustration, partially in section and partially broken away, of another embodiment or modification of electric motor and heat transfer or cooling means in accordance with the present invention.

Referring now to FIG. 5, there is shown and illustrated another embodiment or modification of a permanent rare-earth magnet electric motor constructed in accordance with the principles of the present invention and designated generally by the reference character 10' having a tubular housing or sleeve 12' containing therewithin rare-earth permanent magnets 14' and a low inertia armature structure 16' carried on a preferably non-magnetic shaft 18' together with longitudinally extensive heat receptor and transfer means 34' extending generally perpendicularly inwardly of a motor end cap 30' and closely parallel the armature 16'. The longitudinally extensive heat receptor and transfer elements 34' are provided with fins 36' directed generally towards the armature 16'. Rather than transmitting the heat absorbed outwardly through the end cap 30' by conduction, the longitudinally extensive heat receptor and transfer elements 34' are made hollow, as by having U-shaped channels 42 milled or otherwise formed therein so as to provide a central dividing wall 44. The channels 42 are connected with coolant tubes 46 extending through the end cap 30', as shown, so that coolant fluid, such as air, can be circulated through the channel 42, around the dividing wall 44, and thence be exhausted outwardly of the motor 10'. The channels 42 may be closed, as by means of cover plates 48. Accordingly, circulation of coolant air or other fluid through the channels 42 is effective to cool the heat receptor and transfer elements 34' while yet maintaining the armature atmosphere isolated therefrom, so that the motor 10' remains "totally enclosed."

Further, for a closer fit of the fins 36' adjacent the armature 16' and reduced overall motor size, the heat receptor and transfer elements 34' may be curved, or the inner ends of the central ones of the fins 36' may be shortened, as shown, so as to more closely approach and at least partially surround the armature 16' along the sides thereof between the magnets 14'.

While the invention has been described, disclosed, illustrated and shown in terms of certain embodiments or modifications herein described, disclosed, illustrated, or shown, such other embodiments or modifications as may be suggested to those having the benefit of the teachings herein are intended to be reserved especially as they fall within the scope and breadth of the claims here appended.

We claim:

1. Cooling system for electric motors having a pair of elongated pole pieces and an armature therebetween positioned within a housing comprising at least one generally longitudinally extensive non-magnetic heat receptor and transfer element fabricated of a material having high thermal conductivity positioned within the motor housing adjacent and generally parallel the armature and pole pieces and means structurally connected with said heat transfer element and extending outwardly through the motor housing for transmitting heat outwardly through the housing and dissipating such heat externally of the housing.

2. Cooling system defined in claim 1 wherein said heat receptor and transfer element comprises heat receptor fins extending toward the motor armature.

3. Cooling system defined in claim 2 wherein at least a generally centrally disposed one of said fins is shortened to provide clearance for the motor armature so that said heat receptor and transfer element at least partially surrounds said armature.

4. Cooling system defined in claim 2 further comprising a stirring fan carried by said armature.

5. Cooling system defined in claim 2 wherein said heat receptor and transfer element is solid and integrally mounted with a heat conductive end cap for the motor housing, said end cap being provided with means on the outer face thereof for dissipating heat therefrom.

6. Cooling system defined in claim 5 wherein said last mentioned means comprises outwardly extending fins.

7. Cooling system defined in claim 6 wherein said heat receptor and transfer element, said end cap, and said fins comprise a material selected from the group consisting of aluminum, copper and barium titanate.

8. Cooling system defined in claim 2 further comprising an identical opposing heat transfer element on an opposite side of the armature.

9. Cooling system defined in claim 2 wherein said heat receptor and transfer element is hollow and said means for transmitting heat comprises coolant inlet and outlet tube means for circulating a coolant through said hollow heat receptor and transfer element.

10. Cooling system defined in claim 9 wherein said heat receptor and transfer element is mounted to an end cap of the motor housing with said coolant inlet and outlet tubes extending through said end cap.

11. Cooling system defined in claim 10 wherein said material is selected from the group consisting of aluminum, copper and barium titanate.

12. Electric motor comprising, in combination, a ferro-magnetic generally tubular generally cylindrical sleeve, a pair of opposed elongated magnetic pole pieces mounted in spaced apart relation therewithin to define therewith a magnetic circuit having a single airgap between said pole pieces, an armature having windings extending generally logitudinally parallel said pole pieces mounted for rotation within said airgap and at least one generally longitudinally extensive non-magnetic heat receptor and transfer element of high thermal conductivity positioned within the motor housing adjacent and generally parallel the armature and pole pieces together with means structurally connected with said heat receptor and transfer element and extending outwardly though the motor housing for transmitting heat outwardly through the housing and dissipating such heat externally thereof.

13. Motor defined in claim 12 wherein said heat receptor and transfer element comprises heat receptor fins extending toward the motor armature.

14. Motor defined in claim 13 wherein at least a generally centrally disposed one of said fins is shortened to provide clearance for the motor armature so that said heat transfer element at least partially surrounds said armature.

15. Motor defined in claim 13 further comprising a stirring fan carried by said armature.

16. Motor defined in claim 13 wherein said heat receptor and transfer element is solid and integrally mounted on a heat conductive end cap for the motor sleeve, said end cap being provided with means on the outer face thereof for dissipating heat therefrom.

17. Motor defined in claim 16 wherein said last mentioned means comprises outwardly extending fins.

18. Motor defined in claim 17 wherein said heat receptor and transfer element, said end cap, and said fins comprise a material having the characteristics of aluminum.

19. Motor defined in claim 13 further comprising an identical opposing heat receptor and transfer element on an opposite side of the armature.

20. Motor defined in claim 13 wherein said heat receptor and transfer element is hollow and said means for transmitting heat comprises coolant inlet and outlet tube means for circulating a coolant through said hollow heat receptor and transfer element.

21. Motor defined in claim 20 wherein said heat receptor and transfer element is mounted with an end cap of the motor housing, said coolant inlet and outlet tubes extending through said end cap.

22. Motor defined in claim 21 wherein said material has the characteristics of aluminum.

23. Method of cooling an electric motor comprising providing at least one generally longitudinally extensive non-magnetic heat receptor and transfer element of high thermal conductivity positioned within the motor housing adjacent and generally parallel the armature, providing means structurally connected with said heat transfer element and extending outwardly through the motor housing for transmitting heat outwardly through the motor housing, conductively transmitting heat through such element and dissipating such transmitted heat externally of the housing.

24. Method defined in claim 22 wherein said heat receptor and transfer element is hollow, comprising at least the additional step of, circulating a coolant fluid into said motor, through such hollow heat transfer element, and outwardly thereof.

* * * * *